US011265357B2

(12) United States Patent
Lu et al.

(10) Patent No.: US 11,265,357 B2
(45) Date of Patent: Mar. 1, 2022

(54) AV1 CODEC FOR REAL-TIME VIDEO COMMUNICATION

(71) Applicant: Microsoft Technology Licensing, LLC, Redmond, WA (US)

(72) Inventors: Mei-Hsuan Lu, Bellevue, WA (US); Satya Sasikanth Bendapudi, Bellevue, WA (US); Chun-Wei Chan, Bellevue, WA (US); Ming-Chieh Lee, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 16/672,346

(22) Filed: Nov. 1, 2019

(65) Prior Publication Data

US 2021/0112109 A1    Apr. 15, 2021

Related U.S. Application Data

(60) Provisional application No. 62/913,583, filed on Oct. 10, 2019.

(51) Int. Cl.
| | | |
|---|---|---|
| *G06F 15/16* | (2006.01) | |
| *H04L 65/60* | (2022.01) | |
| *H04L 65/65* | (2022.01) | |
| *H04N 19/164* | (2014.01) | |
| *H04N 19/105* | (2014.01) | |
| *H04N 19/122* | (2014.01) | |

(52) U.S. Cl.
CPC ......... *H04L 65/607* (2013.01); *H04L 65/608* (2013.01); *H04N 19/105* (2014.11); *H04N 19/122* (2014.11); *H04N 19/164* (2014.11)

(58) Field of Classification Search
CPC ... H04L 65/607; H04L 65/608; H04N 19/105; H04N 19/122; H04N 19/164
USPC .................................................. 709/231, 233
See application file for complete search history.

(56) References Cited

U.S. PATENT DOCUMENTS

| | | | |
|---|---|---|---|
| 8,761,203 B2 * | 6/2014 | Jung | H04N 21/2662 370/474 |
| 10,313,685 B2 | 6/2019 | Lee et al. | |
| 2011/0134994 A1 * | 6/2011 | Lu | H04N 21/6437 375/240.02 |
| 2013/0003579 A1 * | 1/2013 | Lu | H04N 21/234327 370/252 |
| 2013/0222538 A1 * | 8/2013 | Chen | H04N 19/12 348/43 |

(Continued)

OTHER PUBLICATIONS

Wang et al., "RTP Payload Format for H.264 Video," <https://tools.ietf.org/html/rfc6184> IETF RFC 6184, 101 pages (May 2011).

(Continued)

*Primary Examiner* — Farzana B Huq
(74) *Attorney, Agent, or Firm* — Klarquist Sparkman, LLP (57) ABSTRACT

Techniques are described for encapsulating AV1 encoded video data within NAL units. For example, the NAL units can be H.264 or HEVC NAL units. Encapsulation can comprise using a reserved NAL unit type. For example, an open bitstream unit comprising AV1 encoded video data can be encapsulated within a NAL unit using a reserved NAL unit type. The NAL unit can be packetized for delivery to another computing device via a computer network.

20 Claims, 8 Drawing Sheets

(56) References Cited

U.S. PATENT DOCUMENTS

| | | | |
|---|---|---|---|
| 2014/0086337 A1* | 3/2014 | Wang | H04N 19/46 375/240.26 |
| 2014/0355616 A1* | 12/2014 | Coban | H04N 19/70 370/395.1 |
| 2015/0085938 A1 | 3/2015 | Hendry et al. | |
| 2015/0110473 A1* | 4/2015 | Wang | H04N 5/91 386/341 |
| 2015/0139338 A1 | 5/2015 | Samuelsson et al. | |
| 2015/0237377 A1 | 8/2015 | Hendry et al. | |
| 2016/0100196 A1* | 4/2016 | Wu | H04N 19/89 375/240.02 |
| 2017/0332085 A1* | 11/2017 | Ramasubramonian | H04N 19/70 |

OTHER PUBLICATIONS

AOMedia, "RTP Payload Format for AV1 (v0.2.1)," <https://aomediacodec.github.io/av1-rtp-spec/>, 27 pages (accessed Oct. 8, 2019).

AOMedia, "AV1 Bitstream & Decoding Process Specification," <https://aomediacodec.github.io/av1-spec/av1-spec.pdf>, 681 pages (Jan. 8, 2019).

Microsoft, "Session Description Protocol (SDP) Extensions," <https://winprotocoldoc.blob.core.windows.net/productionwindowsarchives/MS-SDP/%5bMS-SDP%5d.pdf>, 25 pages (Jun. 1, 2017).

Microsoft, "Real-time Transport Protocol (RTP) Extensions," <https://interoperability.blob.core.windows.net/files/MS-RTP/%5bMS-RTP%5d.pdf>, 68 pages (Aug. 28, 2018).

"International Search Report and Written Opinion issued in PCT Application No. PCT/US20/049619", dated Oct. 27, 2020, 15 Pages.

Wiegand, et al., "Overview of the H.264/AVC Video Coding Standard", In Journal of the IEEE Transactions on Circuits and Systems for Video Technology, vol. 13, Issue 7, Jul. 1, 2003, pp. 560-576.

Sjoberg, et al., "Overview of HEVC High-Level Syntax and Reference Picture Management", In Journal of IEEE Transactions on Circuits and Systems for Video Technology, vol. 22, Issue 12, Oct. 5, 2012, 14 Pages.

Wenger, Stephan, "H.264/AVC over IP", In Journal of IEEE Transactions on Circuits and Systems for Video Technology, vol. 13, Issue 7, Jul. 1, 2013, pp. 645-656.

* cited by examiner

AV1 CODEC FOR REAL-TIME VIDEO COMMUNICATION

CROSS REFERENCE TO RELATED APPLICATIONS

This application claims the benefit of U.S. Provisional Application No. 62/913,583, filed Oct. 10, 2019, which is hereby incorporated by reference.

BACKGROUND

AOMedia Video 1 (AV1) is an open, royalty-free video coding format designed for video transmissions. It can achieve up to 50% higher data compression rates than the H.264 codec, which allows delivery of better quality video in constrained bandwidth networks as well as enabling 4K or high resolution. However, the AV1 format does not provide a specification for streaming video over a network connection.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Technologies are described for encapsulating AV1 encoded video data within NAL units. For example, the AV1 encoded video data can be encapsulated as OBUs within H.264 or HEVC NAL units.

For example, AV1 encoded video data can be encapsulated within NAL units by receiving an OBU that comprises video content encoded according to the AV1 video coding specification, encapsulating the OBU within a NAL unit using a reserved NAL unit type, packetizing the NAL unit into one or more network packets, and transmitting the one or more network packets to another computing device. The NAL units can be H.264 or HEVC NAL units.

As another example, encapsulated AV1 encoded video data that is encapsulated within NAL units can be received by receiving one or more network packets, depacketizing the one or more network packets to obtain a NAL unit, obtaining a NAL unit type value from a NAL unit header of the NAL unit, and when the NAL unit type value is set to a reserved value indicating that the NAL unit encapsulates an OBU, extracting the OBU (comprising video content encoded according to the AV1 video coding specification) from the NAL unit and decoding the OBU. The NAL units can be H.264 or HEVC NAL units.

As described herein, a variety of other features and advantages can be incorporated into the technologies as desired.

DETAILED DESCRIPTION

Overview

As described herein, various techniques and solutions can be applied to encapsulate AV1 encoded video data within H.264 or HEVC network abstraction layer (NAL) units. For example, an open bitstream unit (OBU) can be received where the OBU comprises video content encoded according to the AV1 video coding specification. The OBU can be encapsulated within a NAL unit that uses a reserved NAL unit type in the NAL unit header. The NAL unit can be packetized into one or more network packets. The one or more network packets can be transmitted for receipt by a receiver device.

One or more network packets can be received (e.g., from a sender device). The one or more network packets can be depacketized to obtain a NAL unit. The NAL unit can be examined to obtain a NAL unit type value from a NAL unit header of the NAL unit. The payload of the NAL unit can be decoded according to the obtained NAL unit type value. For example, when the NAL unit type value is set to a reserved value indicating that the NAL unit encapsulates an OBU, the OBU (containing AV1 encoded video data) can be extracted and decoded by an AV1 decoder. When the NAL unit type value is not set to the reserved value, the NAL unit can be decoded normally using an H.264 or HEVC decoder depending on whether the NAL unit is an H.264 NAL unit or an HEVC NAL unit.

AOMedia Video 1 (AV1) is video codec and associated video coding specification provided by the Alliance for Open Media (AOMedia; https://aomedia.org).

NAL Units

In the technologies described herein, AV1 encoded video data (generally referred to herein as AV1 frames) are encapsulated within NAL units. In particular, in some implementations the OBUs that contain the AV1 encoded video data are encapsulated within NAL units. NAL units are defined by the H.264 and HEVC standards. NAL units are used to structure encoded video data for transmission by packet or bitstream oriented transport systems. For example, NAL units can be used to organize encoded video data for transmission via a wired or wireless network connection.

In some implementations, NAL units are packetized for network delivery according to RFC 6184 ("RTP Payload Format for H.264 Video"), which also uses the real-time transport protocol (RTP) defined by RFC 3550 ("RTP: A Transport Protocol for Real-Time Applications"). For example, NAL units can be packetized based at least in part on the maximum transmission unit (MTU) of the network protocol being used (e.g., the NAL can be fragmented and delivered in multiple network packets).

The technologies described herein primarily describe the encapsulation of AV1 encoded video data within H.264 NAL units. However, AV1 encoded video data can be encapsulated within HEVC NAL units in the same manner. For example, encapsulation of AV1 encoded video data within HEVC NAL units can use a similar reserved value for the NAL unity type.

The technologies described herein primarily describe the encapsulation of AV1 encoded video data. However, encoded video data generated by other video coding standards (other than H.264 or HEVC) can also be encapsulated within H.264 or HEVC NAL units. For example, a video bitstream representing video data encoded by the other video coding standard can be divided into bitstream units and encapsulated within H.264 or HEVC NAL units that use a reserved value for the NAL unit type.

Encapsulation Using NAL Units

In the technologies described herein, AV1 frames are encapsulated within NAL units. For example, AV1 frames are encapsulated in NAL units using a reserved type of the NAL unit header.

Figure 1:
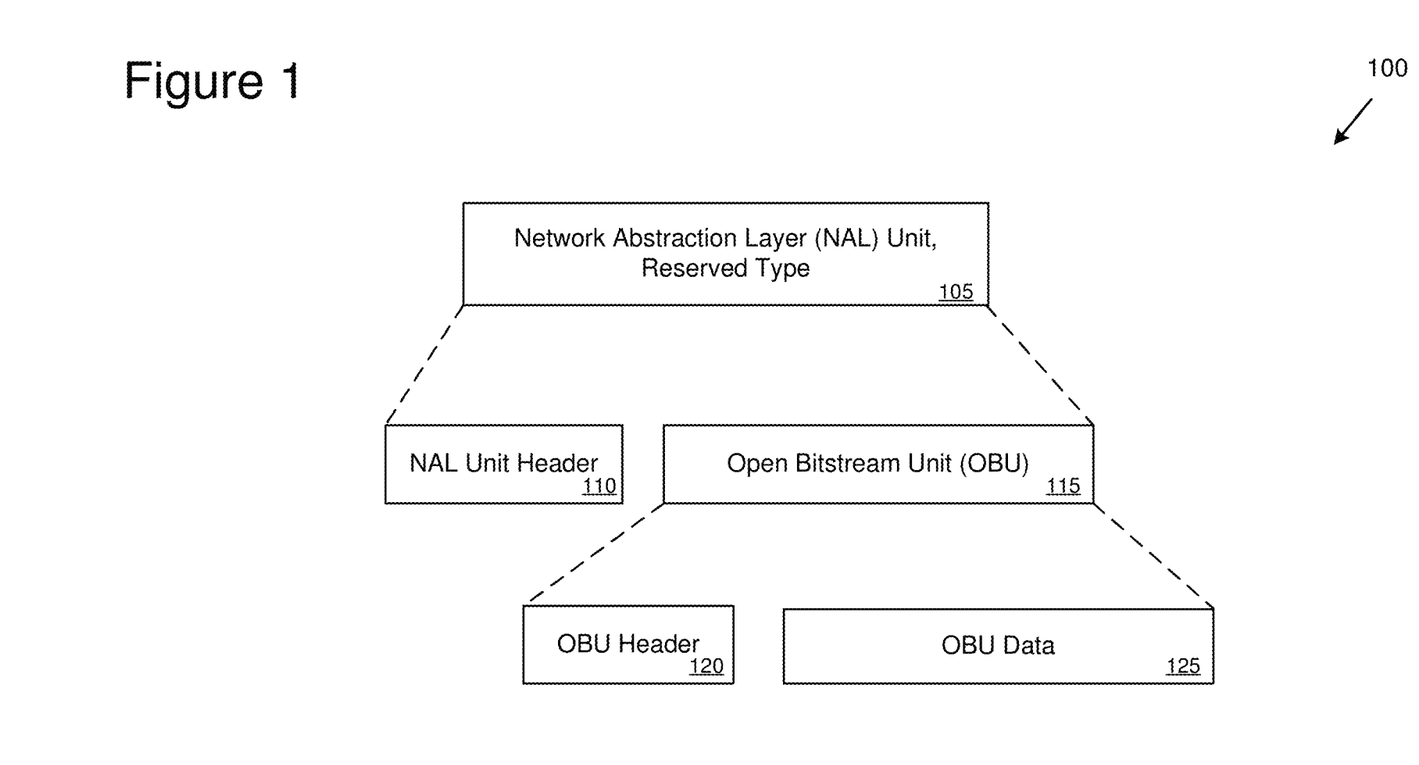
FIG. 1 is a block diagram depicting example encapsulation of AV1 frames within NAL units.

FIG. 1 is a block diagram 100 depicting example encapsulation of AV1 frames within NAL units. The block diagram 100 depicts a visual representation of a NAL unit 105. For example, the NAL unit 105 can be an H.264 NAL unit or an HEVC NAL unit.

The NAL unit 105 includes a NAL unit header 110. In implementations that use an H.264 NAL unit, the NAL unit header 110 is a one-byte header that signals three pieces of information. The first piece of information is a 1-bit value that is set to zero (also referred to as a forbidden_zero_bit syntax element). The second piece information is a reference index field which is a 2-bit value indicating reference picture status of the NAL unit (also referred to as nal_ref_idc). The third piece of information is a 5-bit value that signals the NAL unit type (also referred to as nal_unit_type).

In implementations that use an HEVC NAL unit, the NAL unit header 110 is a two-byte header that signals, among other values, a 1-bit value that is set to zero (also referred to as a forbidden_zero_bit syntax element) and a 6-bit value that signals the NAL unit type (also referred to as nal_unit_type).

In the technologies described herein, the NAL unit type value in the NAL unit header 110 is set to a reserved type which indicates that the NAL unit encapsulates an AV1 frame. In some implementations, the NAL unit type is set to a reserved value of 22 or 23 (e.g., the values of 22 and 23 for the NAL unit type are designated as reserved in the H.264 standard). In other implementations, the NAL unit type is set to another reserved or unspecified value (e.g., a value that is not used by the H.264 or HEVC standard). For example, with HEVC NAL units, the NAL unit type can be set to a reserved value of 41 through 47.

The video encoding and decoding processes can be configured to recognize a reserved NAL unit type (e.g., a NAL unit type with a value of 22 for an H.264 NAL unit) and change behavior accordingly. For example, at the video encoding side, software and/or hardware that is performing the video encoding can be pre-configured to use a specific reserved NAL unit type to indicate that AV1 encoded video data is being encapsulated within NAL units. At the video decoding side, software and/or hardware that is performing the video decoding can be pre-configured to use the same specific reserved NAL unit type to indicate that AV1 encoded video data is being encapsulated within NAL units.

The NAL unit 105 also includes an open bitstream unit (OBU) 115. In the AV1 specification, the coded video bitstream is packetized into OBUs. The OBU 115 includes an OBU header 120 and OBU data 125. The OBU header 120 identifies the type of the OBU 115. Table 1 depicts example OBU types for a current version of the AV1 specification.

TABLE 1

| OBU Type | Name |
| --- | --- |
| 0 | Reserved |
| 1 | OBU_SEQUENCE_HEADER |
| 2 | OBU_TEMPORAL_DELIMITER |
| 3 | OBU_FRAME_HEADER |
| 4 | OBU_TILE_GROUP |
| 5 | OBU_METADATA |
| 6 | OBU_FRAME |
| 7 | OBU_REDUNDANT_FRAME_HEADER |
| 8 | OBU_TILE_LIST |
| 9-14 | Reserved |
| 15 | OBU_PADDING |

The OBU data 125 contains the payload of the OBU 115. For example, the OBU data 125 can contain data for an AV1 coded video frame (e.g., with an OBU type of 6). In general, the OBU can contain any type of AV1 encoded video data. For example, a real-time video communication session can be carried out by encapsulating the OBUs containing the AV1 encoded video bitstream within NAL units for transmission to another computing device.

NAL Reference Index Field

In some implementations, encapsulating AV1 frames within NAL units (e.g., within H.264 NAL units) comprises setting the reference index field in the NAL unit header. Specifically, the 2-bit reference index field (e.g., nal_ref_idc) is set to one of the following four values depicted in Table 2 below. The value of 0 (AV1_NRI_NON_REF) indicates that the frame is a non-reference frame. The value of 1 (AV1_NRI_REG_PFRAME) indicates that the frame is a regular predicted frame (P frame) that can be used as a short-term reference frame. The value of 2 (AV1_NRI_LTR_PFRAME) indicates that the frame is a long-term P frame that can be used as a long-term reference frame. The value of 3 (AV1_NRI_KEY_FRAME) indicates that the frame is a key frame which is an intra frame which resets the decoding process when it is shown.

TABLE 2

| Value | Example Name |
| --- | --- |
| 0 | AV1_NRI_NON_REF |
| 1 | AV1_NRI_REG_PFRAME |
| 2 | AV1_NRI_LTR_PFRAME |
| 3 | AV1_NRI_KEY_FRAME |

The reference index field values of Table 2 have a different meaning than the values used by the H.264 standard. Particularly, meaning of values 1 to 3 of Table 2 are not defined in the H.264 standard.

In some implementations, the reference index field values of Table 2 are used for loss recovery. For example, the reference index field value can be used to perform loss recovery of AV1 frames without having to decode or use information within the AV1 OBU itself. For example, the reference index field value can be used when implementing loss recovery according to U.S. Pat. No. 10,313,685.

In some implementations, encapsulating AV1 frames within NAL units (e.g., within H.264 or HEVC NAL units) comprises including a separate syntax element (e.g., instead of the 2-bit reference index field). For example, the separate syntax element can be included after the NAL unit header (e.g., after NAL unit header 110) and before the OBU (e.g., before OBU 115). The separate syntax element is not part of the H.264 or HEVC standards. The separate syntax element could use the same values of Table 2 or it could use different values (e.g., it could be more than a 2-bit value and therefore be capable of indicating more than four values).

Environments for Encapsulating AV1 Frames

Figure 2:
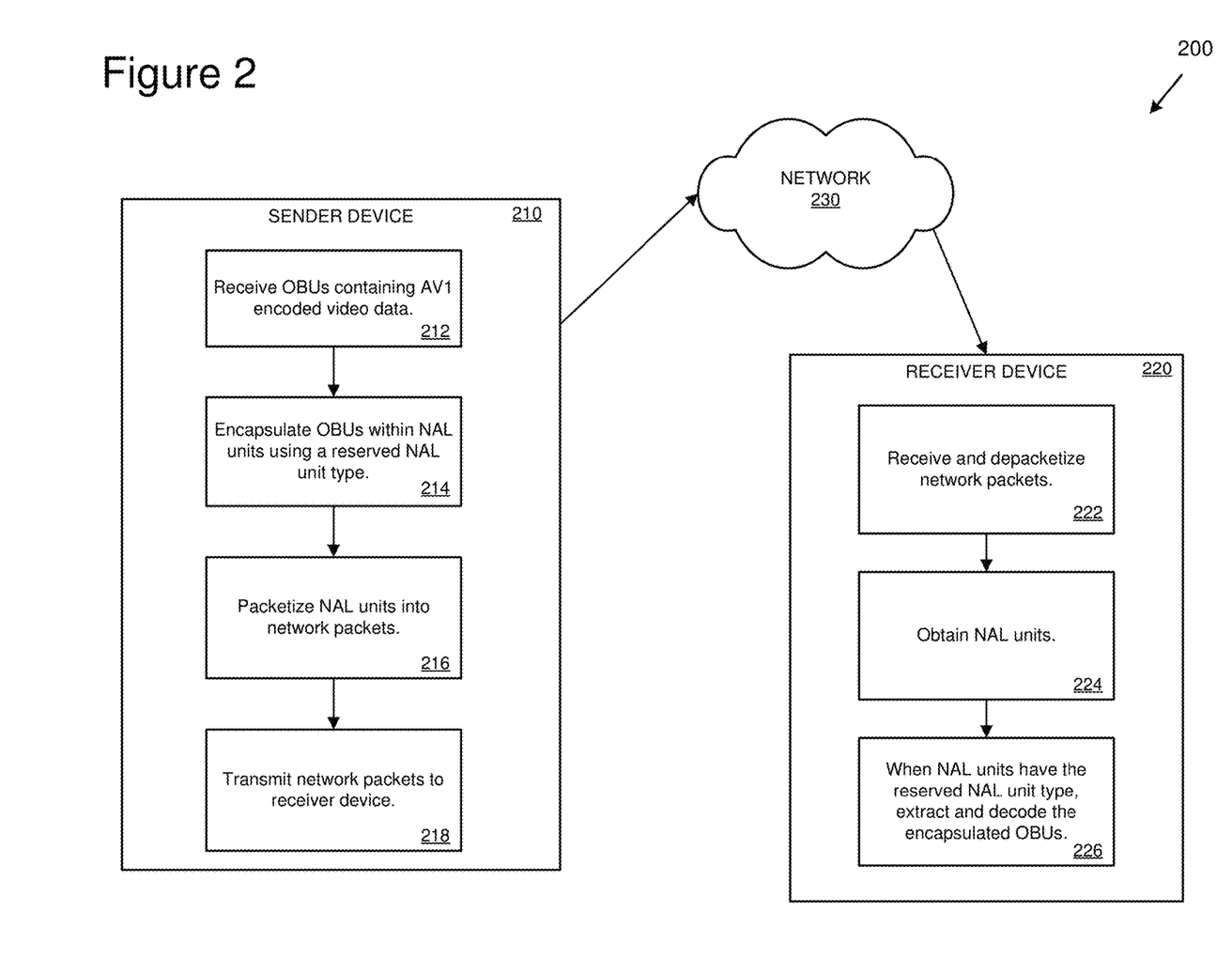
FIG. 2 is a diagram depicting an example environment for sending and receiving network packets with encapsulated AV1 frames.

FIG. 2 is a diagram depicting an example environment 200 for sending and receiving network packets containing AV1 frames that are encapsulated within NAL units. For example, the NAL units can be H.264 NAL units or HEVC NAL units.

The example environment 200 depicts a sender device 210. The sender device 210 can be any type of computing device (e.g., server computer, virtual machine, desktop computer, laptop computer, tablet, phone, or another type of computing device) that encapsulates OBUs within NAL units for transmission in network packets.

The sender device 210 performs a number of operations involved with encapsulating OBUs within NAL units. As depicted at 212, the sender device 210 receives OBUs containing AV1 encoded video data. For example, the sender device 210 can receive the OBUs from an AV1 encoder (e.g., running on the sender device 210) that receives video content (e.g., from a video camera of the sender device 210) and encodes the video content using the AV1 encoder to generate the OBUs.

At 214, the sender device 210 encapsulates the OBUs within NAL units using a reserved NAL unit type (e.g., by setting the NAL unit type in the NAL unit headers to a value of 22 or to another reserved or unused value).

At 216, the sender device 210 packetizes the NAL units into network packets. At 218, the sender device 210 transmits the network packets to the receiver device 220 via a network 230 (e.g., the internet and/or another type of public or private data network). The receiver device 220 can be any type of computing device (e.g., server computer, virtual machine, desktop computer, laptop computer, tablet, phone, or another type of computing device) that receives and decodes OBUs that are encapsulated within NAL units.

At 222, the receiver device 220 receives and depacketizes the network packets from the sender device 210. At 224, the receiver device 220 obtains the NAL units from the network packets.

At 226, the receiver device 220 extracts and decodes the encapsulated OBUs. For example, the receiver device 220 can identify that the NAL units contain OBUs (e.g., instead of H.264 or HEVC encoded video content) by examining the NAL unit type of the NAL headers and determining that it is a reserved value indicating that the NAL units contain OBUs. The receiver device 220 can provide the OBUs to an AV1 decoder (e.g., for decoding and display at the receiver device 220.

For example, the sender device 210 can perform the operations for each of a number of OBUs that it encapsulates as part of a real-time communication session (e.g., a real-time video call). Similarly, the receiver device 220 can perform the operations for each of a number of OBUs it receives and decodes as part of the real-time communication session.

The two computing devices depicted in the example environment 200 are labeled the sender device 210 and the receiver device 220 for ease of illustration. However, either (or both) of the devices can be a "sender" that encapsulates and sends OBUs to the other device. Similarly, either (or both) of the devices can be a "receiver" that receives encapsulated OBUs. In addition, either (or both) of the devices can communicate with additional sender and/or receiver devices (not depicted).

SDP Negotiation

In some implementations, AV1 encoded video data (e.g. in the format of OBUs) is encapsulated within NAL units as part of a streaming video session (e.g., as part of a real-time video communication session) that uses the session description protocol (SDP). For example, the streaming video sessions can be Microsoft® Skype or Teams communication sessions.

In some implementations, new media lines are used to support the AV1 codec in the SDP negotiation between the sender and the receiver. The new media lines are:
a=rtpmap:119 X-MSAV1/90000
a=rtpmap:100 rtx/90000

Even if AV1 is supported by both clients (e.g., the sender and the receiver), the clients still have the choice to use H.264, or another codec. For example, H.264 could be selected based on available computing resources (e.g., an H.264 encoder may use fewer computing resources than an AV1 encoder).

VSR Messages

In some implementations, AV1 encoded video data (e.g. in the format of OBUs) is encapsulated within NAL units as part of a streaming video session (e.g., as part of a real-time video communication session) that uses video source request (VSR) messages defined by the Microsoft real-time transport protocol (RTP) extensions specification. For example, the streaming video sessions can be Microsoft® Skype or Teams communication sessions.

In some implementations, VSR messages are exchanged between the sender and receiver after SDP negotiation is performed.

Once SDP negotiation is done, the receiver generates a VSR with an AV1 entry added to indicate receiver side preference and capabilities. In some implementations, the below entries specify the details for an AV1 VSR:

Payload type (1 byte): The encoding type of the requested video (e.g., 119 is used for AV1).

Flags (1 byte): The video flags. Reserved. The sender SHOULD set it to 0. The receiver MUST ignore it.

Number of MUST instances (2 bytes): When both AV1 and H.264 are supported, this entry must be 0.

Number of MAY instances (2 bytes): When both AV1 and H.264 are supported, this entry contains a positive value for both H.264 and AV1.

The rest of the VSR fields are defined according to the Microsoft real-time transport protocol (RTP) extensions specification.

Figure 3:
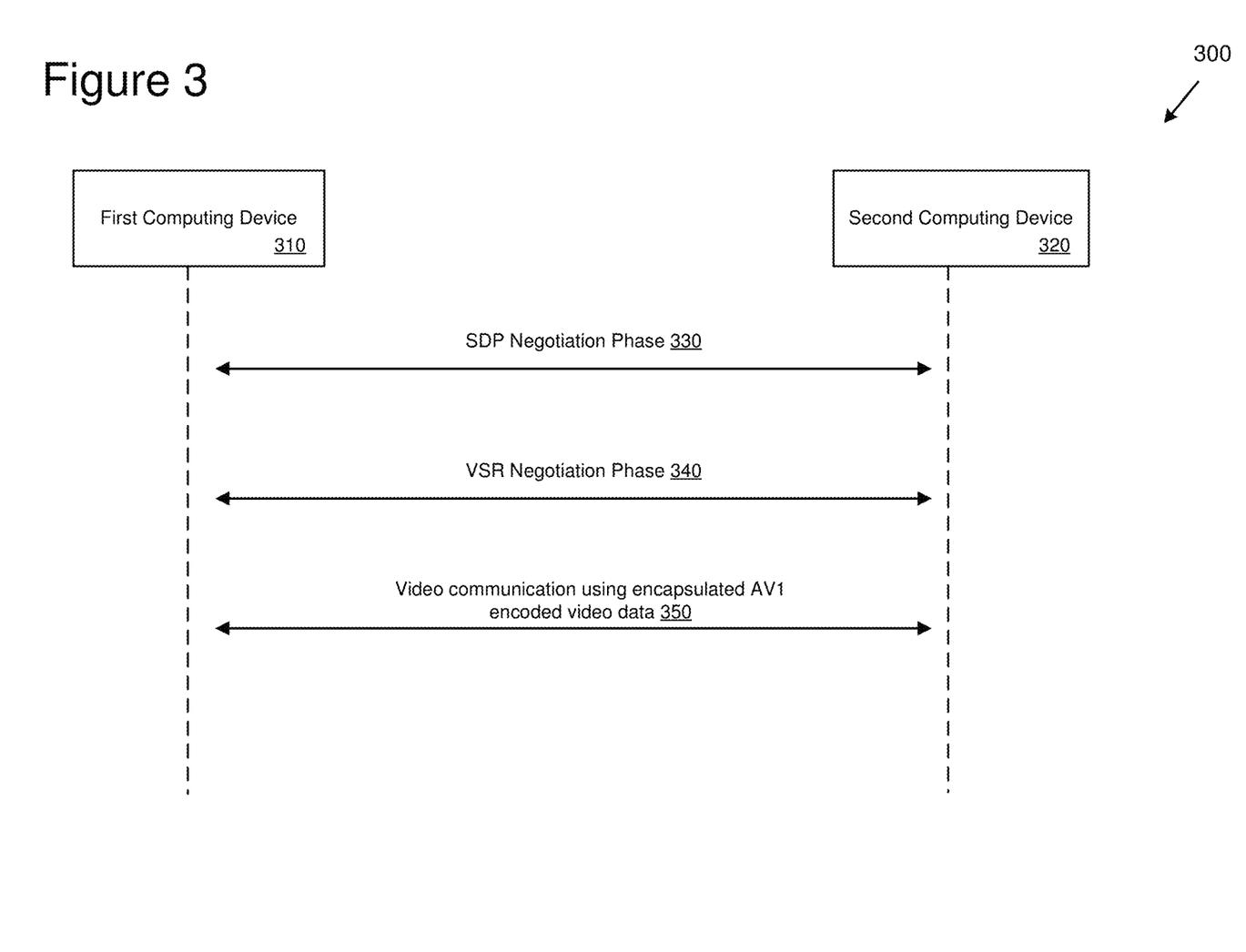
FIG. 3 is a diagram depicting an example procedure for establishing a video communication session in which AV1 frames are encapsulated within NAL units.

FIG. 3 is a diagram depicting an example procedure 300 for establishing a video communication session using the technologies described herein. In the example procedure 300, a first computing device 310 is communicating over a network with a second computing device 320. For example, the first computing device 310 can be a sender device (e.g., sender device 210) and the second computing device 320 can be a receiver device (e.g., receiver device 220).

In order to establish the video communication session, the first computing device 310 and the second computing device 320 exchange SDP messages as part of an SDP negotiation phase 330. For example, the first computing device 310 can send an SDP message to the second computing device 320 that includes information describing the codecs supported by the first computing device 310 (e.g., indicating that the first computing device 310 supports the MSAV1 codec or otherwise indicates that the first computing device 310 supports AV1 data that is encapsulated within NAL units). In response to the SDP message from the first computing device 310, the second computing device 320 can send an SDP message to the first computing device 310 that includes information describing the codecs supported by the second computing device 320 (e.g., indicating that the second computing device 320 supports the MSAV1 codec or otherwise indicates that the second computing device 320 supports AV1 data that is encapsulated within NAL units). After the SDP messages have been exchanged, the first computing device 310 and the second computing device 320 can determine which codec(s) are to be used. For example, if both computing devices support encapsulating AV1 encoded video data within NAL units (e.g., both support the MSAV1 codec), then both computing devices can configure themselves to send and receive streaming video content using H.264 RTP that encapsulates AV1 (e.g., using a pre-determined reserved NAL unit type for the NAL units, such as a value of 22).

After the SDP negotiation phase 330, the first computing device 310 and the second computing device 320 exchange VSR messages as part of a VSR negotiation phase 340. The VSR messages can be exchanged in one or both directions. For example, the VSR messages can be used to notify the other device of the video parameters supported and/or being used (e.g., supported resolutions, profiles, and bitrates, codec being used, etc.). For example, the second computing device 320 can send a VSR message to the first computing device 310 indicating that the second computing device 320 will be encapsulating AV1 encoded video data within NAL units (e.g., using the MSAV1 codec). In some implementations, the VSR payload type field is used to designate AV1 encoded video data (e.g., the MSAV1 codec). After the VSR negotiation phase 340, the video communication session will be configured between the first computing device 310 and the second computing device 320.

After the SDP negotiation phase 330 and the VSR negotiation phase 340 have finished, the first computing device 310 and second computing device 320 can perform video communication (e.g., as part of a real-time video communication session) using encapsulated AV1 encoded video data as depicted at 350.

Methods for Encapsulating AV1 Encoded Video Data within NAL Units

In any of the examples herein, methods can be provided for encapsulating encoded video data (e.g., AV1 encoded video data) within NAL units. For example, the methods can be performed by any number of computing devices (e.g., computing devices that are sending and/or receiving encoded video data). For example, two or more computing devices can be participating in a video communication session (e.g., directly and/or through a server or intermediary computing device).

Figure 4:
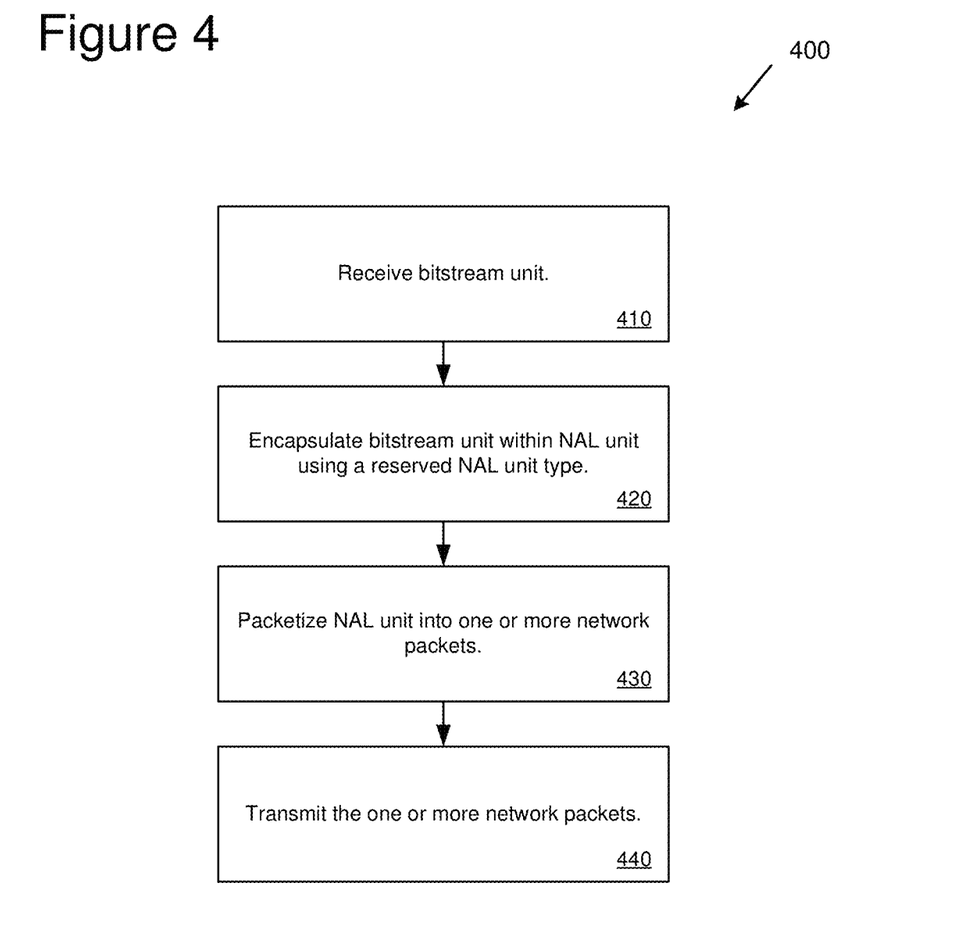
FIG. 4 is a flowchart of an example method for encapsulating encoded video data within NAL units.

FIG. 4 is a flowchart of an example method 400 for encapsulating encoded video data within NAL units. For example, the example method 400 can be performed by a computing device (e.g., via software and/or hardware resources of the computing device), such as sender device 210.

At 410, a bitstream unit is received. The bitstream unit comprises video content encoded according to a video coding specification (e.g., the AV1 video coding specification or another video coding specification that is not H.264 or HEVC). For example, the bitstream unit can be received from a video encoding process (e.g., using an AV1 encoder) that receives video data (e.g., from a video camera or other video source), encodes the received video data according to the video coding specification, and generates bitstream unit containing the encoded video data.

At 420, the bitstream unit is encapsulated within a NAL unit using a reserved NAL unit type. The reserved NAL unit type uses a value that has been defined as a reserved value (e.g., defined as reserved by the H.264 or HEVC standard). For example, a pre-determined reserved value can be used (e.g., a value of 22 or 23 for H.264 NAL units).

At 430, the NAL unit is packetized into one or more network packets.

At 440, the one or more network packets are transmitted for receipt by a receiver computing device. For example, the one or more network packets can be transmitted directly to the receiver computing device. The one or more network packets can also be transmitted to another device (e.g., a server or centralized communication service) for delivery to the receiver computing device. The receiver computing device can receive and decode the bitstream unit. For example, the example method 400 can be performed to encapsulate and transmit multiple bitstream units as part of a real-time video communication session.

In some implementations, multiple video codecs are supported for encapsulation within H.264 or HEVC NAL units. The multiple video codecs are different than H.264 or HEVC. For example, a first video codec could be encapsulated using a first reserved NAL unit type value (e.g., a value of 22), a second video codec (different from the first video codec) could be encapsulated using a second reserved NAL unit type value (e.g., a value of 23), and so on.

Figure 5:
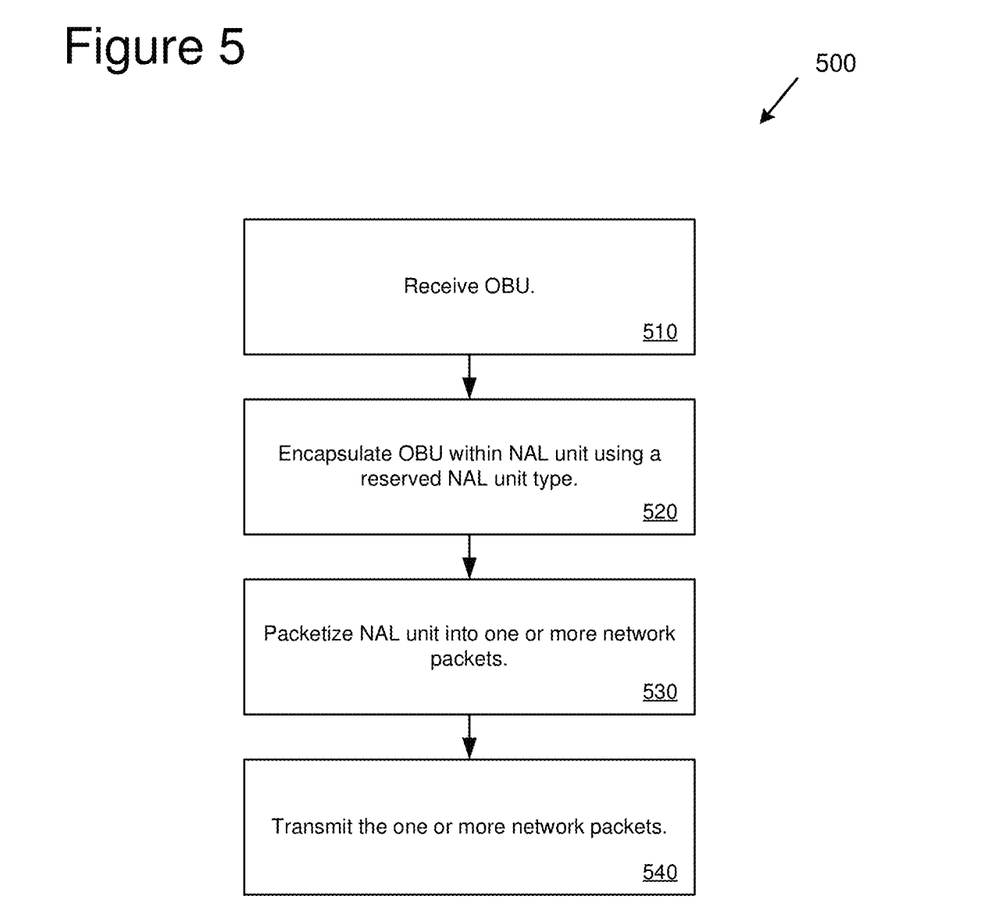
FIG. 5 is a flowchart of an example method for encapsulating AV1 frames within NAL units.

FIG. 5 is a flowchart of an example method 500 for encapsulating AV1 encoded video data within NAL units. For example, the example method 500 can be performed by a computing device (e.g., via software and/or hardware resources of the computing device), such as sender device 210.

At 510, an OBU is received. The OBU comprises video content encoded according to the AV1 video coding specification. For example, the OBU can be received from a video encoding process (e.g., using an AV1 encoder) that receives video data (e.g., from a video camera or other video source), encodes the received video data according to the AV1 video coding specification, and generates OBUs containing the AV1 encoded video data.

At 520, the OBU is encapsulated within a NAL unit using a reserved NAL unit type. The reserved NAL unit type uses a value that has been defined as a reserved value (e.g., defined as reserved by the H.264 or HEVC standard). For example, a pre-determined reserved value can be used (e.g., a value of 22 for H.264 NAL units).

At 530, the NAL unit is packetized into one or more network packets.

At 540, the one or more network packets are transmitted for receipt by a receiver computing device. For example, the one or more network packets can be transmitted directly to the receiver computing device. The one or more network packets can also be transmitted to another device (e.g., a server or centralized communication service) for delivery to the receiver computing device. The receiver computing device can receive and decode the OBU.

For example, the example method 500 can be performed to encapsulate and transmit multiple OBUs as part of a real-time video communication session.

Figure 6:
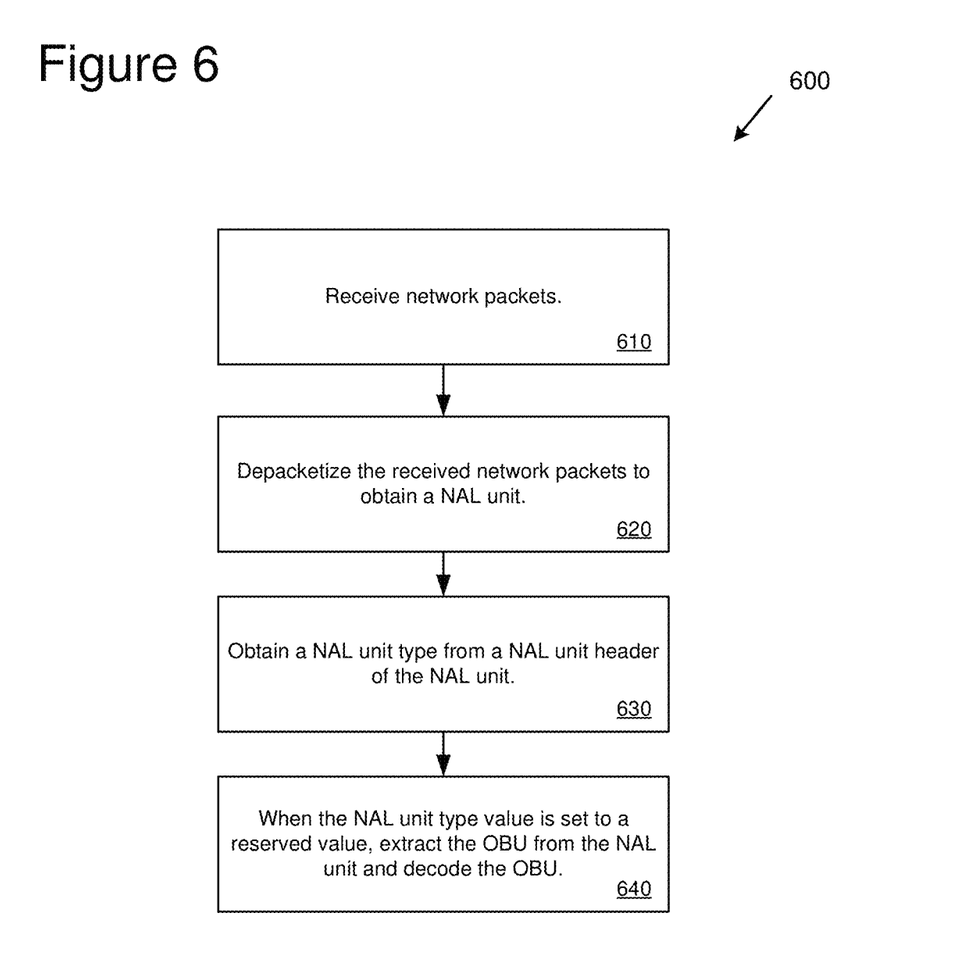
FIG. 6 is a flowchart of an example method for receiving and decoding AV1 frames.

FIG. 6 is a flowchart of an example method 600 for receiving encapsulated AV1 encoded video data within NAL units. For example, the example method 600 can be performed by a computing device (e.g., via software and/or hardware resources of the computing device), such as receiver device 220.

At 610, one or more network packets are received. The one or more network packets contain a NAL unit.

At 620, the one or more network packets are depacketized to obtain the NAL unit.

At 630, a NAL unit type is obtained from a NAL unit header of the NAL unit.

At 640, when the NAL unit type value is set to a reserved value indicating that the NAL unit encapsulates an OBU (i.e., that the NAL unit encapsulates AV1 encoded video data), the OBU is extracted from the NAL unit and decoded. For example, the OBU is provided to an AV1 decoder for decoding and playback. When the NAL unit type value is set to a value other than the reserved value, then the NAL unit can be decoded using a different codec. For example, if the NAL unit is an H.264 NAL unit with a NAL unit type other than 22 or 23 (e.g., with a NAL unit type value of 1-21), then the NAL unit can be decoded using an H.264 decoder.

Computing Systems

Figure 7:
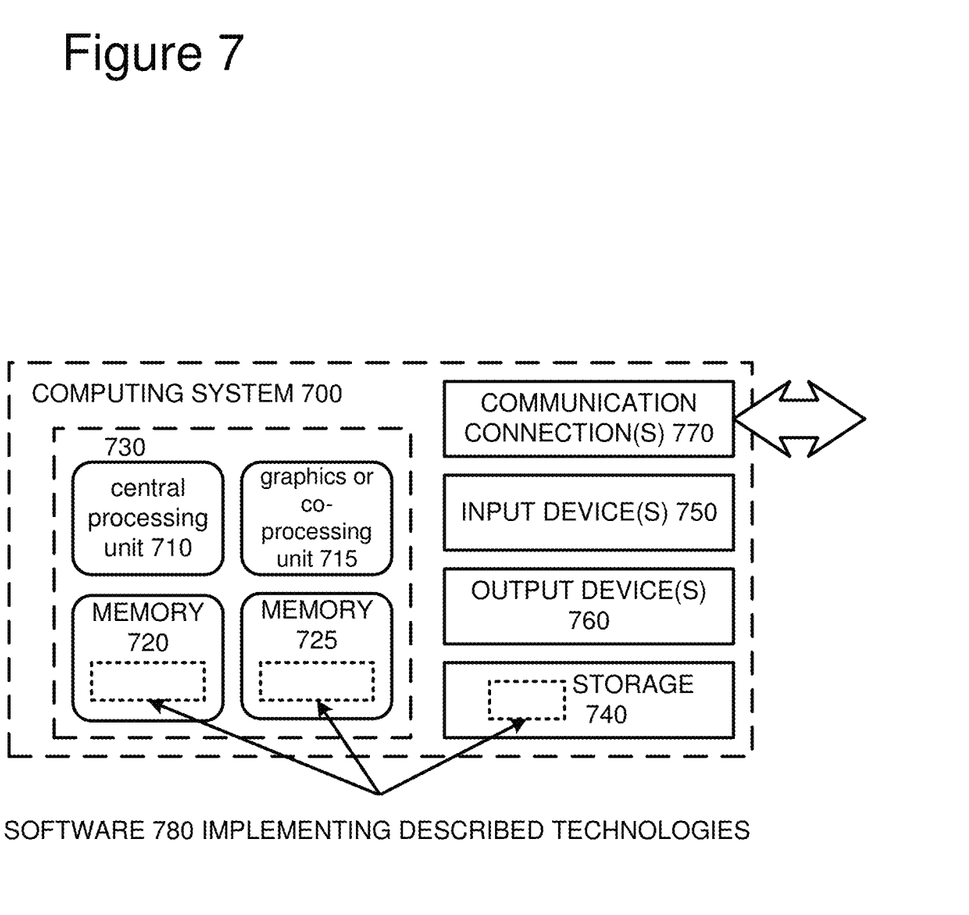
FIG. 7 is a diagram of an example computing system in which some described embodiments can be implemented.

FIG. 7 depicts a generalized example of a suitable computing system 700 in which the described technologies may be implemented. The computing system 700 is not intended to suggest any limitation as to scope of use or functionality, as the technologies may be implemented in diverse general-purpose or special-purpose computing systems.

With reference to FIG. 7, the computing system 700 includes one or more processing units 710, 715 and memory 720, 725. In FIG. 7, this basic configuration 730 is included within a dashed line. The processing units 710, 715 execute computer-executable instructions. A processing unit can be a general-purpose central processing unit (CPU), processor in an application-specific integrated circuit (ASIC), or any other type of processor. A processing unit can also comprise multiple processors. In a multi-processing system, multiple processing units execute computer-executable instructions to increase processing power. For example, FIG. 7 shows a central processing unit 710 as well as a graphics processing unit or co-processing unit 715. The tangible memory 720, 725 may be volatile memory (e.g., registers, cache, RAM), non-volatile memory (e.g., ROM, EEPROM, flash memory, etc.), or some combination of the two, accessible by the processing unit(s). The memory 720, 725 stores software 780 implementing one or more technologies described herein, in the form of computer-executable instructions suitable for execution by the processing unit(s).

A computing system may have additional features. For example, the computing system 700 includes storage 740, one or more input devices 750, one or more output devices 760, and one or more communication connections 770. An interconnection mechanism (not shown) such as a bus, controller, or network interconnects the components of the computing system 700. Typically, operating system software (not shown) provides an operating environment for other software executing in the computing system 700, and coordinates activities of the components of the computing system 700.

The tangible storage 740 may be removable or non-removable, and includes magnetic disks, magnetic tapes or cassettes, CD-ROMs, DVDs, or any other medium which can be used to store information and which can be accessed within the computing system 700. The storage 740 stores instructions for the software 780 implementing one or more technologies described herein.

The input device(s) 750 may be a touch input device such as a keyboard, mouse, pen, or trackball, a voice input device, a scanning device, or another device that provides input to the computing system 700. For video encoding, the input device(s) 750 may be a camera, video card, TV tuner card, or similar device that accepts video input in analog or digital form, or a CD-ROM or CD-RW that reads video samples into the computing system 700. The output device(s) 760 may be a display, printer, speaker, CD-writer, or another device that provides output from the computing system 700.

The communication connection(s) 770 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The technologies can be described in the general context of computer-executable instructions, such as those included in program modules, being executed in a computing system on a target real or virtual processor. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing system.

The terms "system" and "device" are used interchangeably herein. Unless the context clearly indicates otherwise, neither term implies any limitation on a type of computing system or computing device. In general, a computing system or computing device can be local or distributed, and can include any combination of special-purpose hardware and/or general-purpose hardware with software implementing the functionality described herein.

For the sake of presentation, the detailed description uses terms like "determine" and "use" to describe computer operations in a computing system. These terms are high-level abstractions for operations performed by a computer, and should not be confused with acts performed by a human being. The actual computer operations corresponding to these terms vary depending on implementation.

Cloud-Supported Environment

Figure 8:
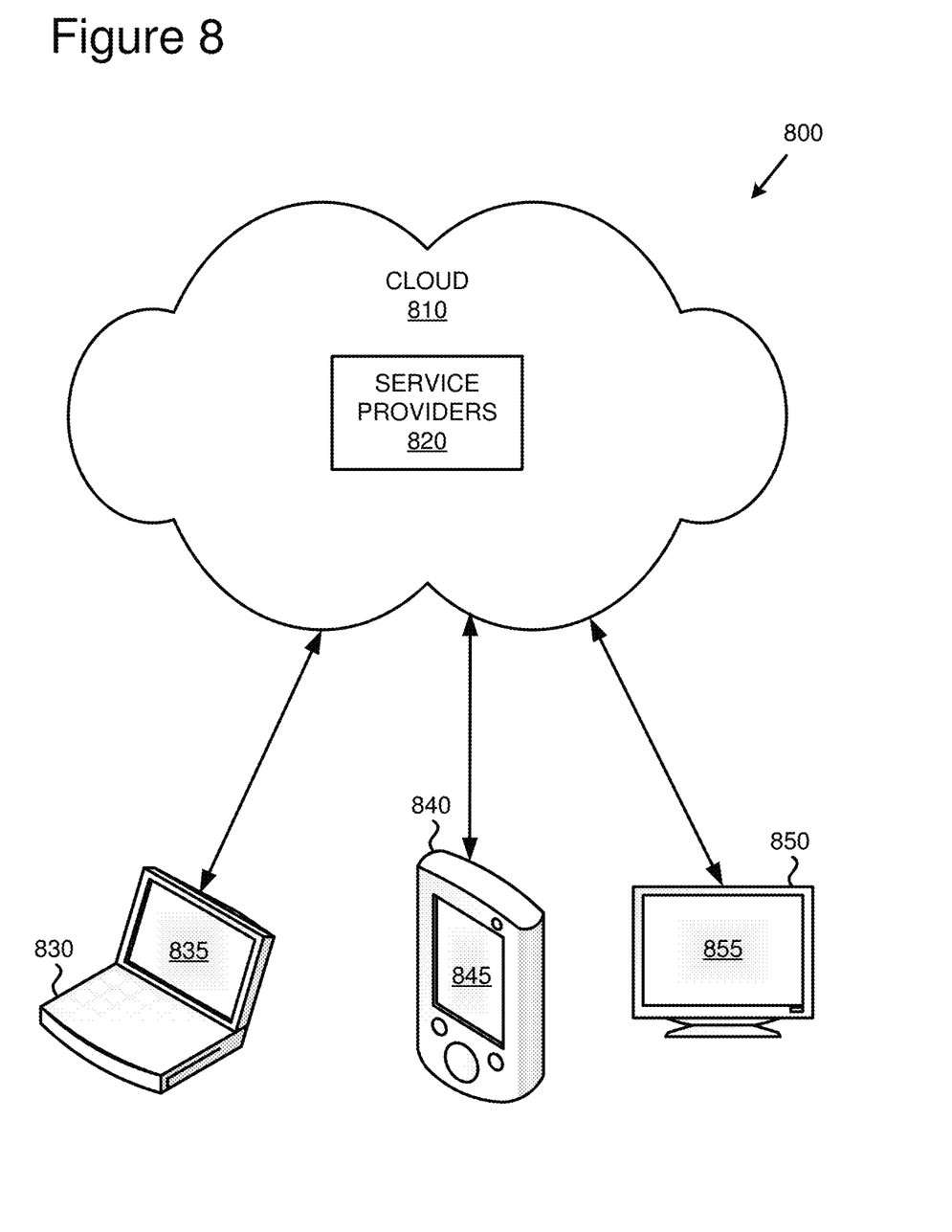
FIG. 8 is an example cloud-support environment that can be used in conjunction with the technologies described herein.

FIG. 8 illustrates a generalized example of a suitable cloud-supported environment 800 in which described embodiments, techniques, and technologies may be implemented. In the example environment 800, various types of services (e.g., computing services) are provided by a cloud 810. For example, the cloud 810 can comprise a collection of computing devices, which may be located centrally or distributed, that provide cloud-based services to various types of users and devices connected via a network such as the Internet. The implementation environment 800 can be used in different ways to accomplish computing tasks. For example, some tasks (e.g., processing user input and presenting a user interface) can be performed on local computing devices (e.g., connected devices 830, 840, 850) while other tasks (e.g., storage of data to be used in subsequent processing) can be performed in the cloud 810.

In example environment 800, the cloud 810 provides services for connected devices 830, 840, 850 with a variety of screen capabilities. Connected device 830 represents a device with a computer screen 835 (e.g., a mid-size screen). For example, connected device 830 could be a personal computer such as desktop computer, laptop, notebook, netbook, or the like. Connected device 840 represents a device with a mobile device screen 845 (e.g., a small size screen). For example, connected device 840 could be a mobile phone, smart phone, personal digital assistant, tablet computer, and the like. Connected device 850 represents a device with a large screen 855. For example, connected device 850 could be a television screen (e.g., a smart television) or another device connected to a television (e.g., a set-top box or gaming console) or the like. One or more of the connected devices 830, 840, 850 can include touchscreen capabilities. Touchscreens can accept input in different ways. For example, capacitive touchscreens detect touch input when an object (e.g., a fingertip or stylus) distorts or interrupts an electrical current running across the surface. As another example, touchscreens can use optical sensors to detect touch input when beams from the optical sensors are interrupted. Physical contact with the surface of the screen is not necessary for input to be detected by some touchscreens. Devices without screen capabilities also can be used in example environment 800. For example, the cloud 810 can provide services for one or more computers (e.g., server computers) without displays.

Services can be provided by the cloud 810 through service providers 820, or through other providers of online services (not depicted). For example, cloud services can be customized to the screen size, display capability, and/or touchscreen capability of a particular connected device (e.g., connected devices 830, 840, 850).

In example environment 800, the cloud 810 provides the technologies and solutions described herein to the various connected devices 830, 840, 850 using, at least in part, the service providers 820. For example, the service providers 820 can provide a centralized solution for various cloud-based services. The service providers 820 can manage service subscriptions for users and/or devices (e.g., for the connected devices 830, 840, 850 and/or their respective users).

Example Implementations

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions or a computer program product stored on one or more computer-readable storage media and executed on a computing device (i.e., any available computing device, including smart phones or other mobile devices that include computing hardware). Computer-readable storage media are tangible media that can be accessed within a computing environment (one or more optical media discs such as DVD or CD, volatile memory (such as DRAM or SRAM), or nonvolatile memory (such as flash memory or hard drives)). By way of example and with reference to FIG. 7, computer-readable storage media include memory 720 and 725, and storage 740. The term computer-readable storage media does not include signals and carrier waves. In addition, the term computer-readable storage media does not include communication connections, such as 770.

Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C++, Java, Perl, or any other suitable programming language. Likewise, the disclosed technology is not limited to any particular computer or type of hardware. Certain details of suitable computers and hardware are well known and need not be set forth in detail in this disclosure.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and sub combinations with one another. The disclosed methods, apparatus, and systems are not limited to any specific aspect or feature or combination thereof, nor do the disclosed embodiments require that any one or more specific advantages be present or problems be solved.

The technologies from any example can be combined with the technologies described in any one or more of the other examples. In view of the many possible embodiments to which the principles of the disclosed technology may be applied, it should be recognized that the illustrated embodiments are examples of the disclosed technology and should not be taken as a limitation on the scope of the disclosed technology.

What is claimed is:

1. A computing device comprising:
   a processor;
   a network interface; and
   memory;
   the computing device being configured to perform operations for encapsulating a frame of encoded video data within one or more network abstraction layer (NAL) units defined in a video codec standard, the operations comprising:
      receiving a bitstream unit comprising video content encoded according to a video codec specification different than the video codec standard, wherein the bitstream unit is an open bitstream unit (OBU) that has been encoded according to the video codec specification, the video codec specification being AV1 video codec specification;
      encapsulating the OBU, encoded according to the AV1 video codec specification, within a NAL unit, wherein the OBU is encapsulated using a reserved NAL unit type in a first field of a NAL unit header of the NAL unit, wherein the encapsulating the OBU within the NAL unit comprises setting a second field of the NAL unit header to a value that indicates reference frame status of the OBU, and wherein the second field supports at least the following values:
         a first value indicating that the frame is a non-reference frame;
         a second value indicating that the frame is a regular predicted frame (P frame) that can be used as a short-term reference frame;
         a third value indicating that the frame is a long-term P frame that can be used as a long-term reference frame; and
         a fourth value indicating that the frame is a key frame;
      packetizing the NAL unit into one or more network packets; and
      transmitting the one or more network packets for receipt by a receiver computing device.

2. The computing device of claim 1, wherein encapsulating the OBU within the NAL unit comprises:
   determining a reserved value for the reserved NAL unit type; and
   setting the first field of the NAL unit header to the reserved value.

3. The computing device of claim 1, wherein the reserved NAL unit type uses a reserved value of 22 or 23.

4. The computing device of claim 1, wherein the OBU comprises:
   an OBU header; and
   OBU data.

5. The computing device of claim 1, wherein the computing device performs the operations to encapsulate and transmit a plurality of OBUs for receipt by the receiver computing device as part of a real-time communication session.

6. The computing device of claim 1, further comprising:
   receiving a second bitstream unit comprising video content encoded according to a second video codec specification different from the AV1 codec specification;
   encapsulating the second bitstream unit within a second NAL unit, wherein the second bitstream unit is encapsulated using a second reserved NAL unit type that is different from the reserved NAL unit type;
   packetizing the second NAL unit into one or more network packets; and
   transmitting the one or more network packets containing the second NAL unit for receipt by the receiver computing device.

7. A method, implemented by a computing device, for encapsulating AV1 encoded video data within network abstraction layer (NAL) units defined in a video codec standard, the method comprising:
   receiving an open bitstream unit (OBU), wherein the OBU comprises a frame of video content encoded according to a video codec specification different than the video codec standard, the video codec specification being AV1 video coding specification;
   encapsulating the OBU, encoded according to the AV1 video codec specification, within a NAL unit, comprising:
      determining a reserved value corresponding to a reserved NAL unit type; and
      setting a first field of a NAL unit header of the NAL unit to the reserved value;
      setting a second field of the NAL unit header to a value that indicates reference frame status of the OBU, wherein the second field supports the following values:
         a first value indicating that the frame is a non-reference frame;
         a second value indicating that the frame is a regular predicted frame (P frame) that can be used as a short-term reference frame;
         a third value indicating that the frame is a long-term P frame that can be used as a long-term reference frame; and
         a fourth value indicating that the frame is a key frame; packetizing the NAL unit into one or more network packets; and transmitting the one or more network packets for receipt by a second computing device.

8. The method of claim 7, wherein the computing device performs the method to encapsulate and transmit each of a plurality of OBUs for receipt by a second computing device as part of a real-time communication session.

9. A method, implemented by a computing device, for receiving encapsulated AV1 encoded video data within network abstraction layer (NAL) units, the method comprising:
   receiving one or more network packets;
   depacketizing the one or more network packets to obtain a NAL unit defined in a video codec standard;
   obtaining a NAL unit type value from a first field of a NAL unit header of the NAL unit; and
   when the NAL unit type value is set to a reserved value, indicating that the NAL unit encapsulates an open bitstream unit (OBU) encoded according to AV1 video coding specification:
      extracting the OBU from the NAL unit, wherein the OBU comprises a frame of video content encoded according to a video codec specification different than the video codec standard, the video codec specification being AV1 video coding specification;

extracting, from a second field of the NAL unit header, a value that indicates reference frame status of the OBU, wherein the second field supports the following values:
- a first value indicating that the frame is a non-reference frame;
- a second value indicating that the frame is a regular predicted frame (P frame) that can be used as a short-term reference frame;
- a third value indicating that the frame is a long-term P frame that can be used as a long-term reference frame; and
- a fourth value indicating that the frame is a key frame; and decoding the OBU.

10. The method of claim 9 further comprising, when the NAL unit type value is set to the reserved value, providing the extracted OBU to an AV1 video decoder for decoding.

11. The method of claim 9 wherein the computing device performs the method to receive and decode a plurality of OBUs from a sender computing device as part of a real-time communication session.

12. The method of claim 9 further comprising:
when the NAL unit type value is not set to the reserved value, decoding encoded video data from the NAL unit using an H.264 video decoder.

13. The method of claim 9, wherein the second field of the NAL unit header of the NAL unit has two or more bits.

14. The method of claim 9, wherein the video codec standard is H.264 standard or high-efficiency video coding (HEVC) standard.

15. The method of claim 9, wherein meanings of the first value, the second value, the third value, and the fourth value possible for the second field of the NAL unit header of the NAL unit are different than values used for the second field of the NAL unit header according to the video codec standard.

16. The computing device of claim 1, wherein the second field of the NAL unit header of the NAL unit has two or more bits.

17. The computing device of claim 1, wherein the video codec standard is H.264 standard or high-efficiency video coding (HEVC) standard.

18. The computing device of claim 1, wherein meanings of the first value, the second value, the third value, and the fourth value possible for the second field of the NAL unit header of the NAL unit are different than values used for the second field of the NAL unit header according to the video codec standard.

19. The method of claim 7, wherein the second field of the NAL unit header of the NAL unit has two or more bits.

20. The method of claim 7, wherein the video codec standard is H.264 standard or high-efficiency video coding (HEVC) standard.

* * * * *